United States Patent Office 3,499,360
Patented Mar. 10, 1970

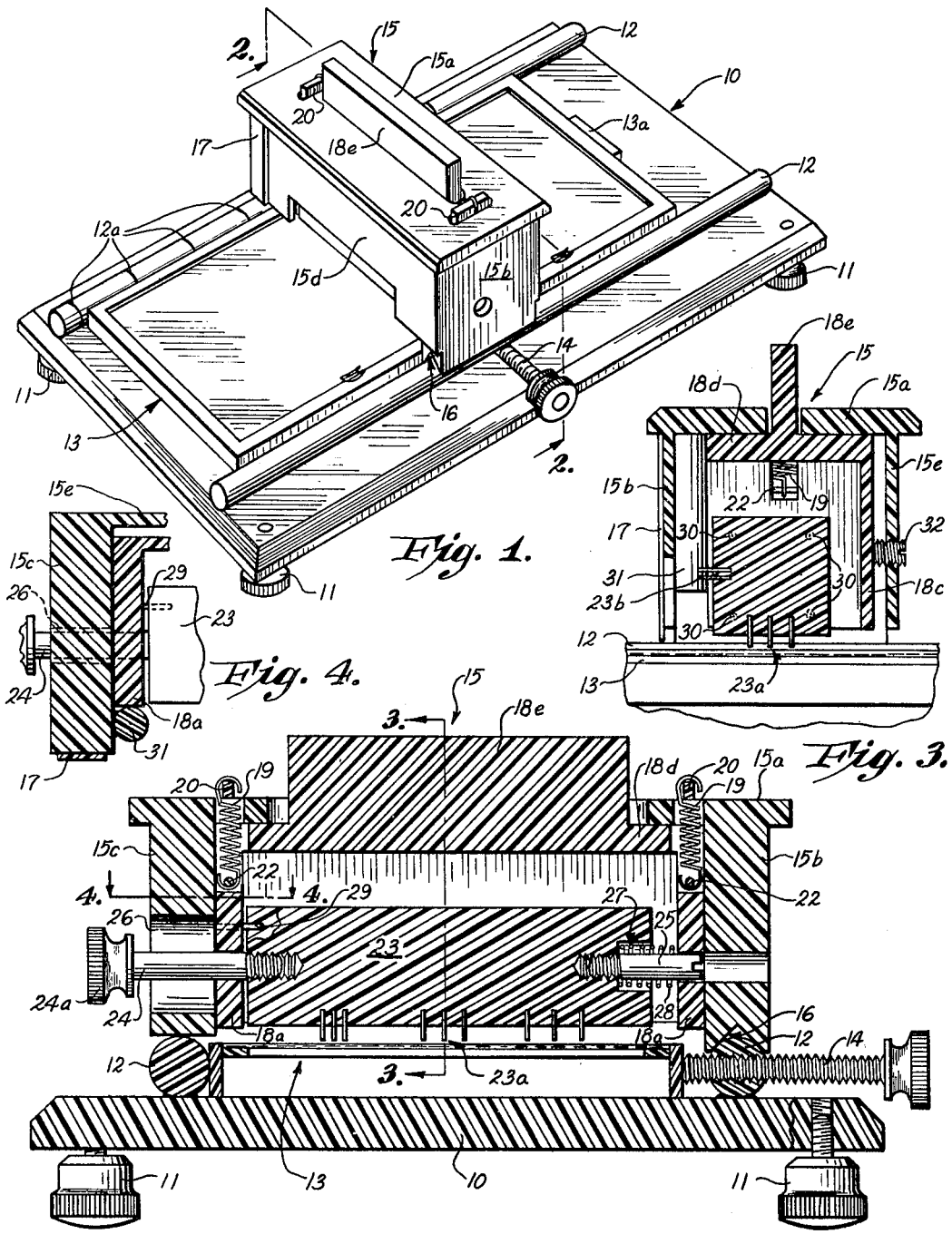

3,499,360
PATTERN CUTTING DEVICE AND INDEXING SYSTEM
Charles L. Davis, 6955 Y St., Lincoln, Nebr. 68505
Filed Feb. 12, 1968, Ser. No. 704,897
Int. Cl. B26f 1/04
U.S. Cl. 83—451
10 Claims

ABSTRACT OF THE DISCLOSURE

A combination immunoelectrophoresis and immunodiffusion pattern cutting device and indexing system has a leveling table suitable for carrying a tray containing agar thereon. The pattern cutter is slidably mounted on the leveling table above the agar. The pattern cutter includes a plurality of patterns, each of which may be alternately selected and positioned from a location within the device for pattern cutting with respect to the agar on the tray. A pattern is cut in the agar by manually pressing down on an extended upper surface of the pattern cutter construction. Indexing marks on the table cooperate with the cutter to facilitate optimal spacing of the patterns as they are cut in the agar.

BACKGROUND AND BRIEF DESCRIPTION OF THE INVENTION

Immunoelectrophoresis is a combination of two techniques—electrophoresis and immunodiffusion—developed to overcome a difficulty experienced in separating and identifying highly complex proteins by other chemical and physical means. The development of micro-methods for tthe technique has now added considerably to its scope and usefulness, exploiting the highly specificity and sensitivity of immuno reactions for the analysis of minute amounts of material in both clinical and research laboratories. Micro-immunoelectrophoretic techniques have been successfully employed in the study of gamma globulins, alterations of serum proteins in disease, snake venoms, virus proteins, plant sap and in many other fields.

Typical electrophoresis accessories which are utilized with the above-mentioned techniques generally result in the placing of agar on a tray and in the punching of a pattern in same with a pattern cutting device. A sample of a protein or other antigens are subjected to electrophoresis within the confines of the pattern. It is often desirable to punch more than a single pattern along the length of the agar within the tray. Changing these patterns can, and often does, result in a time consuming and difficult operation.

My invention relates to a uniquely constructed pattern cutter, selector means and indexing system for use with conventional electrophoresis equipment such as agar and starch gel trays and related equipment. The combination pattern cutter and selector means are constructed to ride on parallel rails, one of the rails being indexed to facilitate pattern cutting at optimally spaced intervals. The agar tray is appropriately located in between the two parallel tracks on the upper surface of a leveling table for the pattern cutting operation.

The construction of the combination pattern cutter and selector means includes an outer shell, in the shape of a rectangular parallelepiped, having one end portion grooved for sliding engagement with one of the parallel rails. The opposite end portion of same slidably rests on other parallel track. A plurality of pattern cutting surfaces in the form of a rectangularly shaped block is centrally mounted for selective rotation within the outer shell. Alocking pin is fixedly positioned within the outer shell. A locking pin is fixedly positioned within the outer ity of dimple recesses in the pattern block so that a particular pattern cutting surface of the block may be locked in position for the cutting operation.

The block itself is spring biased upwardly within the outer shell and likewise laterally biased to engage the locking pin. A push bar extends upwardly through a central cut out portion in the outer shell and provides a surface for manually depressing the selected pattern cutting surface against the spring tension. When the pattern surface contacts the agar surface a like pattern is cut therein. Once pressure is no longer applied to the bar, the cutting assembly assumes its position within the outer shell structure. When it is desired to select a different pattern, a suitable knob may be pushed inwardly thereby laterally moving the pattern block between the end portions of the outer shell and removing the locking pin from its engaged condition within the block's dimple recess. The knob may then be rotated to thereby orient a different pattern cutting surface in the cutting position. The entire pattern cutter and selector means may be moved with the outer shell, same being alignable with cooperating indexing marks on one of the rails, thereby optimally locating and spacing each pattern that is cut in the agar.

An object of the invention is to provide a uniquely constructed immunoelectrophoresis pattern cutter device having a plurality of pattern cutting surfaces, each of which may be selectively moved into a pattern cutting position from within the device. It is an important feature of this invention that the pattern cutting surfaces and the means for moving same into a pattern cutting position have successfully eliminated the need for maintaining a large supply of pattern cutters of different sizes, shapes and characteristics. Correspondingly, the time consuming job of interchanging pattern cutters may now be simply and efficiently accomplished by inwardly pushing and rotating a conventional knurled knob.

Another object of the invention is to provide a pattern cutter of the character described in combination with an indexing system for optimally spacing the patterns cut along the surface of agar or starch gel.

A further object of the invention is to provide a pattern cutter of the character described which is efficiently and economically manufactured almost entirely of acrylic plastic such as Plexiglas.

A still further object of my invention is to provide a pattern cutter of the character described that cooperates with a leveling table having parallel guide rails thereon. These rails facilitate the holding of an agar tray in proper alignment and direct the movement of the pattern cutter during the pattern cutting operation. One of the guide rails is properly indexed and cooperates with the pattern cutting structure for providing the indexing system mentioned above. By guiding the pattern cutter on indexed rails, inaccurate positioning and cutting is successfully eliminated.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith, and in which like reference numerals are used to indicate like parts in the various views;

FIG. 1 is a perpective view of the combination pattern cutter, agar tray and leveling table;

FIG. 2 is an enlarged sectional view of the combined elements taken generally along the line 2—2 of FIG. 1 in the direction of the arrows;

FIG. 3 is a partial sectional view primarily of the pattern cutter and agar tray taken generally along the line 3—3 of FIG. 2 in the direction of the arrows; and FIG. 4 is a partial sectional view taken generally along the line 4—4 of FIG. 2 in the direction of the arrows.

Turning now more particularly to the drawing, reference numeral 10 is used to designate the leveling table used with the subject combination immunoelectrophoresis and immunodiffusion pattern cutter and selector means. Threadably movable legs 11 are located at each corner of table 10. The legs are operable to be moved up or down relative to the table surface, thereby changing the elevation of same for leveling purposes. A pair of guide rails 12 are glued or otherwise affixed to the upper surface of table 10 in a parallel arrangement with the left (see FIGS. 1 and 2) rail having a plurality of indices 12a etched thereon. These index markings may be spaced either an equal distance apart or in some preselected order and are to be used in conjunction with the pattern cutter for proper pattern spacing, as will be seen later.

A conventional agar tray 13 is properly sized to rest on the upper surface of table 10 between guide rails 12 with a width tolerance of approximately ¼–½ inch. An externally threaded nylon screw 14 with a knob on one end thereof is received through a centrally located and suitably threaded aperture in the right (see FIGS. 1 and 2) rail 12 for the purpose of frictionally engaging the adjacent outer edge of tray 13 thereby fixedly holding same during the pattern cutting operation. An upright stop 13a is centrally positioned between the guide rails 12 and serve to further position and restrict movement of the agar tray 13 on table 10. I have found that the above-mentioned level table, guide rails and portions of tray 13 may conveniently be manufactured of a clear acrylic plastic such as Plexiglas, as may the now to be discussed pattern cutter and selector means.

The combination pattern cutter and selector means is generally represented by the numeral 15 and is supported by an outer shell generally in the shape of an open lower sided rectangular parallelepiped having five numbered sides, e.g. 15a through 15e, with the lower side open. The two end members of the outer shell (the sides 15b and 15c) are constructed of a thicker plastic material and designed to contact the upper surfaces of the guide rails. Side 15b has its lower end grooved, thereby approximately the shape of an inverted V (indicated by the numeral 16). Groove 16 engageably contacts substantially the upper half portion of the non-indexed guide rail 12 within its contacting area. As will be seen, the combined cutter and selector means slidably moves with the outer shell on rails 12 with the grooved contacting end 16 providing stability and confining the movement of the device thereon. The lower surface of end 15c rests flush against the upper surface of the left hand rail 12 (see FIG. 2). In this manner, the outer shell which essentially houses the pattern cutter and selector means, may be slidably moved upon guide rails 12 over the length of the agar tray 13.

To facilitate the location of the outer shell with respect to index marking 12a slide marker 17 is glued or otherwise affixed to the left hand portion of side 15d. This marker may be brought into registration with a particular index marking corresponding to a portion of the agar tray. Slide marker 17 may be constructed of a white or other distinctive color acrylic plastic to facilitate easy alignment of the lower end thereof with a selected one of the indices 12a.

An inner shell or subassembly is mounted for reciprocating movement within the outer shell and closely approximates the general shape of the outer shell. This subassembly includes end members 18a and 18b. A single vertical side 18c is affixed to the right hand outer edges of the two end pieces discussed above. An upper horizontal surface 18d spans the distance between the two end members 18a and 18b and supports a vertical upwardly extending push bar 18e which may be glued or similarly connected thereto. The top 15a of the outer shell is suitably apertured or slotted to permit the push bar to extend therethrough.

A pair of tension springs 19 are looped over holding members 20 (same being glued to the upper surfaces of top 15a), and extend downwardly through suitable apertures in top 15a on either side of the above-mentioned push bar slot. Both top 18d of the subassembly and the end members 18a and 18b are appropriately slotted (see numeral 21 in FIG. 2) to receive springs 19. A spring holding pin 22 is set in the plastic end members across each slot at the lower portion thereof within each of end members 18a and 18b. In this manner, the springs 19, under tension, urge the subassembly upwardly so that the upper surface of top 18d is flush against the lower surface of top 15a with push bar 18e extending through its associated slot in top 18d. The entire subassembly may be forced downwardly against the tension springs 19 by manually pushing down on push bar 18e.

The subassembly or the second shell discussed immediately above, carries with it the pattern block generally indicated by the numeral 23. Each long rectangular side (there being four in the preferred embodiment) of block 23 may take the form of a conventional pattern cutting surface. FIG. 3 shows block 23 as having two such surfaces 23a and 23b, however it should be understood that there may be as many pattern cutting surfaces as the shape and size of the block will permit. This block is supported for selective rotative movement between the two end members 18a and 18b by a long shanked screw 24 and a flat headed stud 25, respectively. Likewise, the relative dimensions are such that block 23 may also be moved laterally between the end members as will be seen later. Screw 24 has an externally threaded end portion which is engaged within the left hand portion of block 23. The shank portion of this screw member extends through an aperture in side 18a and then through an elongated slot 26 in side 15c of the outer shell. The flat headed stud 25 threadably engages the right hand end portion of block 23. Counterbore 27 surrounds the shank portion of stud 25 and permits compression spring 28 to fit over same within the counterbore area so that the spring bears against the right hand end portion of the block within the counterbore area and against the left hand end portion of side end 18b of the subassembly. In this manner, block 23 is urged to the left by spring 28, as seen in FIG. 2.

From the above, it will be clear that block 23 may be rotated by applying a rotative force to the knurled knob 24a of the long shanked screw 24. Inadvertent movement of the block is precluded by the cooperative use of a locating pin 29 in conjunction with any one of a plurality of registering dimple recesses 30. Locating pin 29 is fixedly set within side 18a of the subassembly so that same extends inwardly toward block 23. The left hand portion of block 23 (FIG. 2) is selectively recessed in each corner portion thereof for the purpose of receiving pin 29 therein when the pin and one of the recesses are aligned. In order to rotate block 23 once locating pin 29 has been positioned within any of the dimple recesses 30, knob 24a is pushed inwardly or to the right as seen in FIG. 2 so that block 23 moves to the right against the compression spring 28. This action frees locating pin 29 from the area that it formerly occupied within one of the dimple recesses 30. Knob 24a may then be rotated (simultaneously rotating block 23) so that any one of the remaining recesses may be aligned with locating pin 29. When knob 24a is no longer being forced inwardly or to the right, compression spring 28 will return block 23 to the position shown in FIG. 2, thereby locking block 23 with a different pattern cutting surface opposite the agar in tray 13.

In order to further facilitate the reciprocating movement of the subassembly (and pattern cutting block), a guide rail 31 is located adjacent each end member 18a and 18b. These shorter rails contact and generally guide the reciprocating movement of the subassembly during movement of same. If it would become necessary to lock the subassembly in a particular position, a set screw 32 may be tightened through an aperture in side 15e and against side 18c. The inward movement of the setscrew 32 forces the subassembly up against rails 13, thereby frictionally locking same in the desired position and precluding the abovementioned reciprocating movement.

In operation, leveling table 10 is properly adjusted for optimum pattern cutting with the various legs 11 either raised or lowered to cause table 11 to occupy the desired position. At this point, either eight 1″ x 3″ microscope slides or two 3¼″ x 4″ lantern slides may be inserted in the tray and then the agar tray 13 is filled with agar of a proper consistency for pattern cutting and placed between guide rails 12 up against a limit stop 13a. Screw 14 may then be moved inwardly against the side of the tray, thereby locating same in a pattern cutting position. In this manner, limit stop 13a and the various index marks 12a appearing on the left hand rail 12 are properly correlated for optimal pattern spacing during the pattern cutting operation.

As mentioned above, the pattern block may comprise a plurality of pattern cutting surfaces. These surfaces may be selectively moved into a pattern cutting position by inwardly forcing knob 24a and rotating same so that a different pattern cutting surface appears opposite the agar. The first pattern may be cut with the slide marker aligned with the first index marking 12a. At this time, push bar 18e will be depressed causing the pattern block 23 to be forced downwardly against the tension of spring 19, thereby cutting a selected pattern in the agar. When pressure is released from the bar 18e, springs 19 cause the return of the pattern block and the entire pattern cutting device may be slidably moved on the rail to the next index marking. If it is desired to change the pattern, all that is needed is to push knob 24a inwardly and rotate block 23 so that locating pin 29 enters into a different dimple recess 30. With a new pattern selected, push bar 18e is again depressed and the pattern cut at the new location spaced optimal distances apart. This process may be continued throughout the length of the agar tray with a different pattern or pattern grouping selectively arranged and cut in the agar tray without a need for cumbersome pattern changing manipulations or the need for several different pattern cutting devices.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A device for cutting patterns in agar or gelatinous solutions or like nature and consistency, said device comprising
   an outer shell having at least two spaced apart opposed sides,
   a pattern block mounted between said sides, said pattern block having a plurality of pattern cutting surfaces thereon,
   means for selectively positioning at least one of said pattern cutting surfaces opposite the agar, and
   means for pushing at least one of said positioned pattern cutting surfaces down into said agar thereby cutting a pattern in said agar.

2. The invention as in claim 1, wherein said selective positioning means includes
   means for locking said block in said selected position, and
   means for releasing said block from said locking means and for rotating said block after releasing same to select and position alternate pattern cutting surfaces opposite the agar for cutting a pattern therein.

3. The invention as in claim 2 wherein said pattern cutting device is mounted on a leveling table, said leveling table having
   two parallel guide rails affixed to the upper surfaces thereof,
   a plurality of indexing markings on at least one of said rails, said markings facilitating the spacing of patterns along the surfaces of said agar as said patterns are cut by said device.

4. The invention as in claim 2 wherein the pattern block is carried for reciprocating movement relative to said outer shell by a subassembly having at least two spaced apart opposed sides with said block located therebetween, said locking means being comprised of a locking pin projecting toward said block from a first position in one of said subassembly sides, said block having an end portion opposite said pin, said end portion having a plurality of recesses defined therein for receiving said pin, there being a corresponding relationship between the number of recesses and pattern cutting surfaces, said pin thereby locking said block with at least one of said pattern cutting surfaces opposite said agar when said pin is received within a selected one of said recesses.

5. The invention as in claim 4 wherein said block is spring biased toward said locking pin and wherein said releasing and rotating means includes a shaft fixedly set in said block and extending from said recessed end through aligned openings in adjacent sides of said subassembly and said outer shell, said shaft operable to be pushed inwardly against said spring bias and to rotate said block when said recessed block end no longer receives said locking pin.

6. The invention as in claim 5 wherein said pattern cutting device is mounted on a leveling table, said table having
   two spaced apart guide rails affixed to the upper surface thereof,
   an agar tray,
      said tray operable to hold said agar therein for pattern cutting purposes,
      said tray being located between said rails with said device slidably supported on said rails above said tray.

7. The invention as in claim 6 wherein at least one of said rails has
   a plurality of selectively spaced index markings thereon,
   a slide marker located on said device,
   said slide marker being alignable with each one of said index markings as said device slides along said table on said rails,
   said aligned markings and said marker thereby cooperating to identify convenient pattern spacings for cutting patterns in said agar.

8. The invention as in claim 1 wherein said pattern cutting device is mounted on a leveling table,
   said table having two spaced apart guide rails affixed to the upper surface thereof,
   an agar tray,
      said tray operable to hold said agar therein for pattern cutting purposes,
      said tray being located between said rails with said device slidably supported on said rails above said tray.

9. The invention as in claim 8 wherein at least one of said rails has a plurality of selectively spaced index markings thereon, a slide marker located on said device,
said slide marker being alignable with each one of said index markings as said device slides along said table on said rails, said aligned markings and said marker thereby cooperating to identify convenient pattern spacings for cutting patterns in said agar.

10. The invention as in claim 9 wherein one of said outer shell sides has a grooved end in sliding contact with one of said rails, said grooved end and said rail cooperating to stabilize the movement of said device on said rails.

References Cited
UNITED STATES PATENTS 2,655,215  10/1953  Kertes _____ 234—100 X
3,407,133  10/1968  Oliva et al. _____ 204—299

WILLIAM S. LAWSON, Primary Examiner

U.S. Cl. X.R.

83—522, 552, 620, 926; 204—180, 299